Patented Jan. 19, 1932

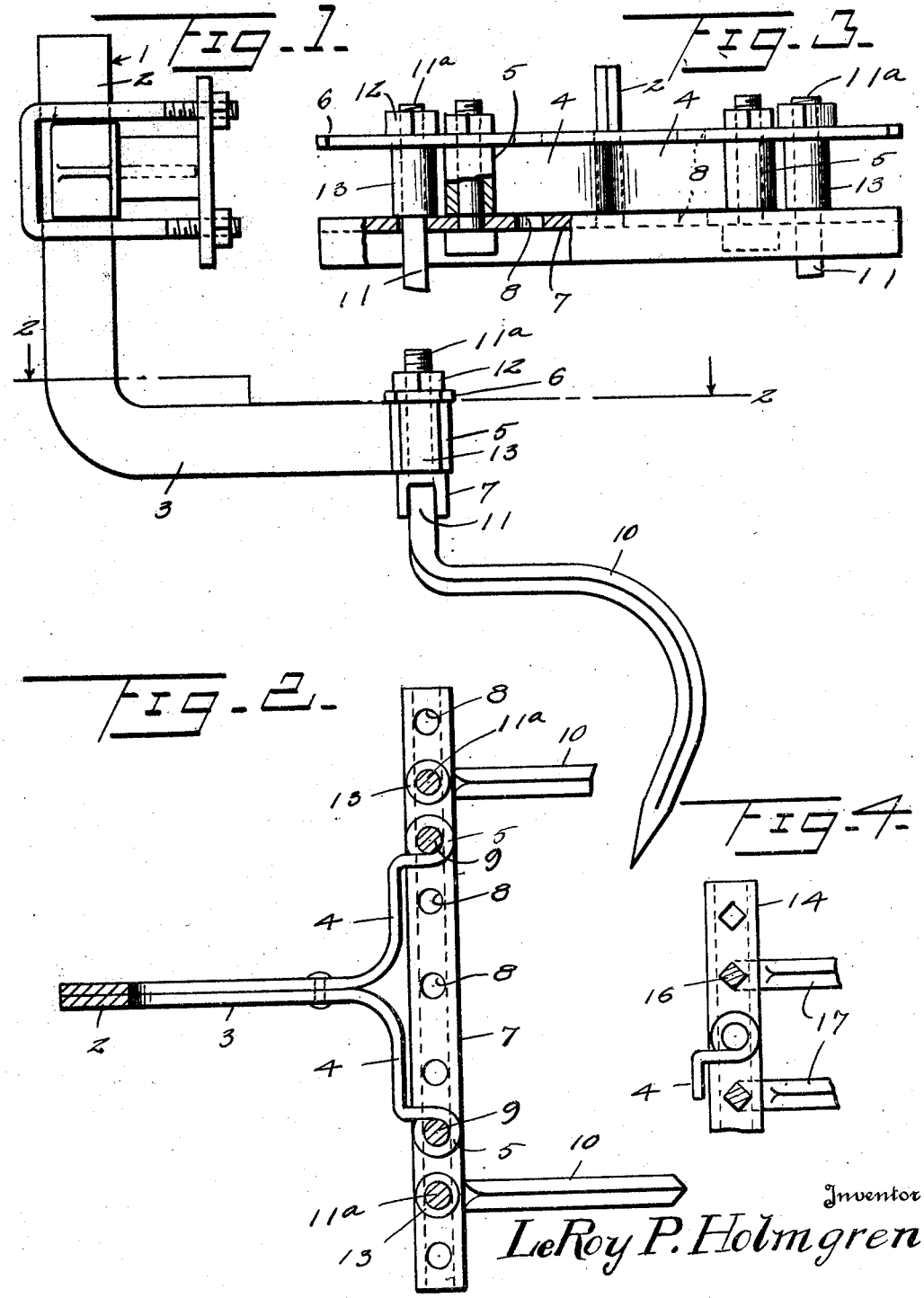

1,842,268

UNITED STATES PATENT OFFICE

LE ROY P. HOLMGREN, OF BEAR RIVER CITY, UTAH

CULTIVATOR ATTACHMENT

Application filed July 22, 1930. Serial No. 469,858.

This invention relates to improvements in harrow or digger attachments for cultivators, the device being designed particularly for use in connection with beet cultivators.

The primary object of the present invention is to provide an improved form of attaching bar, whereby the digger teeth may be more rigidly held in operative position than heretofore.

Another object of the invention is to provide a novel means for securing the digger teeth to the attachment so that they will not turn from set position.

The invention broadly contemplates the provision of an attaching bar formed of an integral piece of material of substantial length bent intermediate its ends, a portion of the bar adjacent the free ends being disposed at right angles to the main body part of the bar and the free ends of the portions being turned to extend laterally in opposite directions and each terminating in an eye. These eyes are disposed between a pair of plates, the lower one of which is of inverted U-shape in cross-section and both plates are provided with a plurality of apertures, certain of which receive bolts or teeth which pass through the eyes at the ends of the supporting bar.

Digger teeth of straight or curved form are provided with threaded shanks which extend through the aligned apertures of the plates, a portion of the shank of each tooth being of square outline so that it will engage between the sides of the U-shaped lower bar and thus be held against rotation, a nut being applied to the upper end of the shank and bearing against the top bar to maintain the digger point in place.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view in side elevation of the attachment embodying the present invention.

Figure 2 is a sectional view taken on the line 2—2 of Figure 1.

Figure 3 is a view in rear elevation, parts thereof being in section.

Figure 4 is a detailed sectional view of a slightly modified form of the present invention taken upon substantially the same line as the sectional view shown in Figure 2.

Referring more particularly to the drawings wherein like numerals of reference indicate corresponding parts throughout the several views, the numeral 1 indicates generally the standard or post of the present digger carrying device, which standard may be secured in any suitable manner to the beam of the cultivator or other agricultural implement in connection with which the digger is to be used. This post comprises a vertical portion 2 and a right angularly disposed lower portion 3 and, as shown, it is formed of strap iron which has been bent intermediate its ends, the two portions being brought into side by side relation and after bending the lower portion into the right angle portion shown the ends are then bent to extend laterally to form the arms 4, each of which terminates in the eye 5 which is disposed in a plane parallel with but forwardly of the plane occupied by the adjacent arm. The eyes 5 are thus arranged in alignment forwardly of the line or vertical plane in which the aligned oppositely directed arms 4 are arranged.

Extending across the upper and lower ends of the eyes 5 and connecting the same are the bars 6 and 7, the bar 6 being flat while the bar 7 is U-shaped in cross-section and directed downwardly as shown. Each of these bars 6 and 7 is provided with a plurality of bolt holes 8 through certain of which bolts 9 pass which extend through the eyes 5 and hold the bars in position thereagainst.

The digger teeth may be of the straight or curved type, a tooth of the curved type being here shown and indicated by the numeral 10. Each of these teeth has an upwardly extending shank portion 11 which is of square cross-section at its lower end while at its upper end it is smaller and of circular cross-section as indicated at 11ª. The circular portion 11ª of the tooth shank is threaded at its upper end as shown and this circular portion extends through an aperture of the lower plate and an aligned aperture of the upper plate and receives upon its upper end a holding nut 12 which draws the squared portion 11 up into the channel of the plate 7 as shown. Since the width of the squared lower portion of the shank of each tooth is only slightly less than the interior width of the channel bar or plate 7 it will be seen that the tooth shank cannot turn after it has been drawn into the position shown.

The circular portion 11ª of each tooth shank is surrounded between the bars 6 and 7 by a sleeve or collar 13 which prevents bending of either bar when the nuts 12 are tightened up on the upper bar upon the tooth shank.

While I have shown and described a curved digger tooth it is, of course, to be understood that I do not wish to be limited to a tooth of this character for it will be readily obvious that a straight tooth may be substituted for the curved tooth without departing from the spirit of the invention.

In the preferred form of the invention the teeth are held against rotation by engagement with the sides of the channel bar 7 as described. In the modified form shown in Figure 4 the channel bar has been replaced by a flat bar so that both upper and lower bars corresponding to the bars 6 and 7 of the preferred form are perfectly flat the lower one of these bars being indicated generally by the numeral 14. This bar 14 and the one overlying it is provided with a series of apertures 15 of polygonal design and the shanks 16 of the teeth 17 are correspondingly shaped so as to snugly engage in these apertures and thus be held against rotation. From this it will be readily seen that by providing these apertures of polygonal design the teeth 17 may be adjusted to extend at an oblique angle to the line of travel of the cultivator for operation upon inclined surfaces of the ground, as for example along the sides of ditches or the like.

Having thus described my invention, what I claim is:

1. In an agricultural implement attachment, a digger tooth carrier, comprising a post having one end turned to extend at right angles, a pair of arms extending in opposite directions laterally from said right angularly directed end, each of said arms terminating in an eye, said eyes being disposed in a vertical plane forwardly of and parallel with the vertical plane of the aligned arms, a flat bar disposed above and resting upon said eyes, a channel bar of U-shaped cross-section disposed beneath said eyes substantially parallel with said first bar and having the channel directed downwardly, said bars being provided with aligned apertures, bolts passing through said bars and through said eyes to secure the bars and eyes together, and digger teeth each having a shank of polygonal cross-section at its lower end and reduced circular cross-section at its upper end, each of said shanks having the upper end extended through aligned openings in said bars and the lower end positioned in said channel, the upper end of each shank being threaded to receive a nut bearing upon said top bar to maintain the lower end of the shank securely in the channel of the lower bar.

2. An agricultural implement attachment, comprising a channel bar member and a flat bar disposed above and parallel with the channel bar and in spaced relation thereto, said channel bar having the open side thereof directed downwardly and further having a series of apertures through the web portion thereof, said overlying flat bar also having apertures therethrough, each in alignment with an aperture in the channel bar, tooth members each having a shank consisting of a lower portion of polygonal cross section and an upper portion of circular cross section, the polygonal portion of the tooth shank fitting snugly in the channel of the channel bar and having the circular portion extended upwardly through an aperture therein and an aperture of the overlying flat bar, sleeve members disposed between the channel bar and the flat bar and each having a circular portion of a tooth shank extended therethrough, said sleeves serving as spacers for said bars and as reinforcing means for said shanks, means engaging the upper end of each tooth shank and bearing against the top of the flat bar for maintaining the tooth in position, and a bracket element, having connection with said bars and adapted to be connected to an agricultural implement to support the bars in working position.

In testimony whereof I hereunto affix my signature.

LE ROY P. HOLMGREN.